United States Patent
Chen et al.

(10) Patent No.: US 11,246,270 B2
(45) Date of Patent: Feb. 15, 2022

(54) DEVICE AND METHOD FOR BREEDING BLUEBERRY-SPECIFIC MYCORRHIZAL FUNGI

(71) Applicant: Shaanxi University of Technology, Shaanxi (CN)

(72) Inventors: Zhiyuan Chen, Shaanxi (CN); Gongwei Qin, Hanzhong (CN)

(73) Assignee: Shaanxi University of Technology, Hanzhong (CN)

( * ) Notice: Subject to any disclaimer, the term of this patent is extended or adjusted under 35 U.S.C. 154(b) by 275 days.

(21) Appl. No.: 16/558,292

(22) Filed: Sep. 2, 2019

(65) Prior Publication Data

US 2020/0236874 A1    Jul. 30, 2020

(30) Foreign Application Priority Data

Jan. 28, 2019 (CN) .......................... 201910082637.2

(51) Int. Cl.

| A01G 18/10 | (2018.01) |
|---|---|
| A01G 18/22 | (2018.01) |
| A01G 24/20 | (2018.01) |
| A01G 17/00 | (2006.01) |
| A01G 24/15 | (2018.01) |
| A01G 24/60 | (2018.01) |

(52) U.S. Cl.
CPC .......... *A01G 18/10* (2018.02); *A01G 17/005* (2013.01); *A01G 18/22* (2018.02); *A01G 24/15* (2018.02); *A01G 24/20* (2018.02); *A01G 24/60* (2018.02)

(58) Field of Classification Search
CPC ........ A01G 18/10; A01G 18/22; A01G 24/15; A01G 24/20; A01G 24/60; A01G 17/005
See application file for complete search history.

(56) References Cited

FOREIGN PATENT DOCUMENTS

| CA | 2031627 A1 * | 6/1991 | ............ A01G 18/10 |
|---|---|---|---|
| CN | 106434349 A | 2/2017 | |
| CN | 106605524 A * | 5/2017 | |
| CN | 108112298 A * | 6/2018 | |
| CN | 109845516 A * | 6/2019 | ............ A01G 18/10 |

* cited by examiner

*Primary Examiner* — Christopher D Hutchens

(57) ABSTRACT

A device and a method for breeding blueberry-specific mycorrhizal fungi. The device includes a container, where a bottom of the container is laid with perlite to form a perlite layer; an absorbent cotton is arranged on the perlite layer; a hole for planting is provided in the absorbent cotton and blueberry tissue culture seedlings or moss seedlings are placed in the hole; and a spore transfer solution is provided around the blueberry tissue culture seedlings or moss seedlings. When used as a bacterial fertilizer for inoculation in the field, the pieces of absorbent cotton are buried directly around the blueberry roots; while used for research, one of the pieces of the absorbent cotton is washed with sterile water and filtered with a filter paper to obtain mycorrhizal fungi spores.

9 Claims, 1 Drawing Sheet

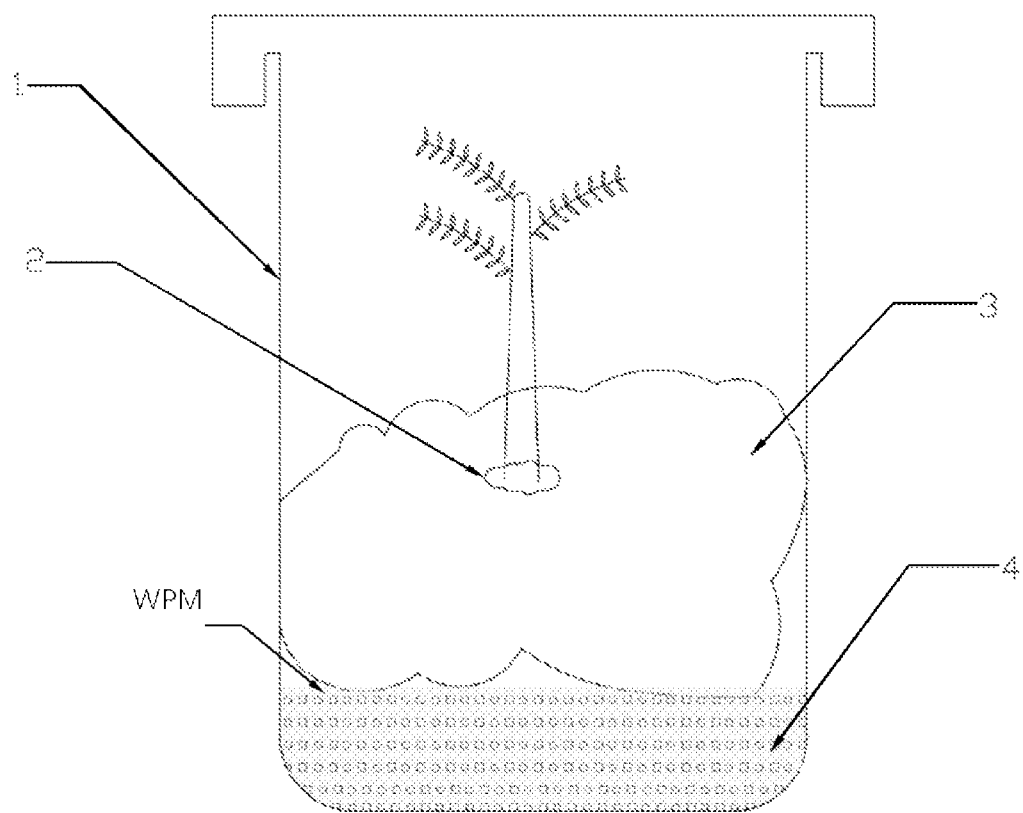

DEVICE AND METHOD FOR BREEDING BLUEBERRY-SPECIFIC MYCORRHIZAL FUNGI

CROSS REFERENCE TO RELATED APPLICATIONS

This application claims the benefit of priority from Chinese Patent Application No. 201910082637.2, filed on Jan. 28, 2019. The content of the aforementioned application, including any intervening amendments thereto, is incorporated herein with reference in its entirety.

TECHNICAL FIELD

The present application relates to mycorrhiza breeding, and more particularly to a device and a method for breeding blueberry-specific mycorrhizal fungi.

BACKGROUND OF THE INVENTION

*Vaccinium Linn.* pertains to the genus *Vaccinium* of the family Ericaceae. Many species of *Vaccinium* bearing blue-colored berries are offered with a commercial name "blueberry". Blueberries are perennial deciduous or evergreen shrub plants that are distributed from the northern hemisphere to the tropical high-mountain regions. There are about 400 species of *Vaccinium* in the world, including about 91 species and 28 varieties in China. Fruits of the blueberry are rich in various nutrients such as anthocyanins, providing unique physiological health care effects, and therefore, blueberry is listed as one of the top five healthy foods by the Food and Agriculture Organization of the United Nations. Because of its special flavor, high nutritional and health care value, the fruit and its products are greatly consumed all over the world and always in short supply. It has been 112 years since wild blueberries were cultivated in the United States in 1906. However, the price of blueberry has always been high due to the difficulty in cultivation. In China, blueberry was initially introduced in the 1980s, and the large-scale cultivation was not preliminarily achieved until 2000. By 2015, the nationwide blueberry growing area is 8000 $hm^2$, which is 3.1‰ of the citrus growing area, 3.4‰ of the apple growing area and 3.0% of the kiwi growing area. In order to overcome the difficulties in blueberry cultivation, many techniques have been studied and applied, and soil improvement is the most critical step.

The difficulty in blueberry cultivation is due to the characteristics of its roots. Blueberry is a typical crop free of root hair and has a shallow root system which is generally distributed in shallow soil layers and extends outward to the middle of the rows. Blueberry roots are fibrous and free of root hair, but the naturally occurring blueberry roots are symbiotic with mycorrhizal fungi to form mycorrhizae. Endophytic mycorrhizal fungi are present in almost all the fine roots of blueberries, thus solving the low absorption of water and nutrients to the blueberry roots due to the lack of root hairs. In recent years, it has been demonstrated by many researches that the infection of mycorrhizal fungi plays an important role in the growth and nutrient absorption of blueberry.

Chinese Patent Application Publication CN 106434349 A, titled "Method for Collecting Mycorrhizal Fungi from Sterile Blueberry Tissue Culture Seedlings", discloses a method to collect mycorrhizal fungi from sterile blueberry tissue culture seedlings. In this method, blueberry tissue culture seedlings are transplanted to the field, and after cultivated for a period of time, the roots are cut into segments and cultured in a plate to isolate the mycorrhizas. However, this method has the following defects: 1) it fails to complete the entire process in the laboratory; specifically, the blueberry tissue culture seedlings are obtained in the laboratory, while the mycorrhizal fungus infection is completed in the field; 2) the cut roots of blueberry seedlings need to be cultured in a plate to isolate mycorrhizal fungi, and the blueberry seedlings cannot be recycled, resulting in waste of tissue culture seedlings; 3) the isolation process is complicated and time-consuming; and 4) it is not convenient for inoculation in agricultural production.

SUMMARY OF THE INVENTION

An object of the invention is to provide a device and a method for breeding blueberry-specific mycorrhizal fungi.

A device for breeding blueberry-specific mycorrhizal fungi includes a container, wherein a bottom of the container is laid with perlite to form a perlite layer; an absorbent cotton is arranged on the perlite layer; a hole for planting is provided in the absorbent cotton and a blueberry tissue culture seedling or moss seedling is placed in the hole; and a spore transfer solution is provided around the blueberry tissue culture seedling or moss seedling.

A thickness of the perlite layer is 5-10 mm, and the perlite is sterilized under high pressure before use.

The perlite layer is soaked in a liquid woody plant medium (WPM) at pH 5.0, and the liquid WPM is 10 mm higher than the perlite layer.

The blueberry tissue culture seedling is transplanted directly to the hole for planting, while the moss seedling is sterilized and then transplanted to the hole for planting.

Another object of the invention is to further provide a method for breeding blueberry-specific mycorrhizal fungi, comprising:

1) pre-loading perlite on a bottom of a culture bottle to form a perlite layer followed by high-pressure sterilization; and pouring a liquid woody plant medium (WPM) at pH 5.0 into the culture bottle to immerse the perlite layer;

2) under a sterile operating environment, digging out a hole for planting in a middle of a loose absorbent cotton treated by high-pressure sterilization; soaking blueberry tissue culture seedling or moss seedling in a mixture of naphthylacetic acid and indolebutyric acid for 1 min and then transplanting the soaked seedling to the hole for planting; and then compacting the absorbent cotton;

3) transferring the blueberry tissue culture seedling mulched with the absorbent cotton to the culture bottle; and dropwise adding 5-8 drops of a spore transfer solution of mycorrhizas at equal intervals around blueberry capillary roots; and 4) sealing and placing the culture bottle in a radiation greenhouse for 2 weeks; after the mycorrhizal fungi grow with blueberry roots to cover the absorbent cotton, transferring the absorbent cotton from the culture bottle under a sterile condition; and cutting the absorbent cotton into pieces with a scissor and sealing the pieces in a sterile bag.

In some embodiments, in step (1), a particle size of the perlite is 0.5-1 mm and a thickness of the perlite layer is 5-10 mm.

In some embodiments, in step (2), a concentration of the mixture of naphthylacetic acid and indolebutyric acid is 300 µg/L.

In some embodiments, in step (3), the spore transfer solution is a mixture composed of 95% by weight of an edible vegetable oil, 3% by weight of Tween 80 and 2% by weight of Tween 20; the spore transfer solution after sterilized is added with spores of the mycorrhizas and mixed uniformly to ensure that there are at least 50 spores in each drop of the spore transfer solution.

In some embodiments, in step (4), when used as a bacterial fertilizer for inoculation in the field, the pieces of the absorbent cotton are buried directly around the blueberry roots; while used for research, one of the pieces of the absorbent cotton is washed with sterile water and filtered with a filter paper to obtain the spores of the mycorrhizal fungi.

The present invention has the following beneficial effects.

In the present application, blueberry tissue culture seedlings or moss seedlings are employed to breed specific mycorrhizal fungi, enabling the continuous industrial culture of mycorrhizal fungi. In addition, spores from the mycorrhizal fungi are dispersed in the absorbent cotton, facilitating the spore separation and the direct inoculation to the blueberries in the field.

BRIEF DESCRIPTION OF THE DRAWINGS

FIG. 1 schematically shows a device of the present invention.

In the drawing: 1—container; 2—hole for planting; 3—absorbent cotton; and 4—perlite.

DETAILED DESCRIPTION OF EMBODIMENTS

The present invention will be described clearly and completely below with reference to the embodiments. Apparently, these embodiments are not intended to limit the invention. Other embodiments obtained by those skilled in the art without departing from the spirit of the invention should fall within the scope of the invention. As shown in FIG. 1, this embodiment provides a device for breeding blueberry-specific mycorrhizal fungi, including: a container 1, which can be in any shape. A bottom of the container is laid with perlite 4 to form a perlite 4 layer, where a particle size of the perlite 4 is 0.5-1 mm and a thickness of the perlite 4 layer is 5-10 mm. Meanwhile, liquid WPM is contained in the container 1 and the perlite 4 layer is soaked in the liquid WPM, where the liquid WPM has pH of 5.0 and a depth about 10 mm larger than the thickness of the perlite 4 layer. An absorbent cotton 3 is arranged above the liquid WPM and a hole 2 for planting is provided in the absorbent cotton 3. Blueberry tissue culture seedlings or moss seedlings are placed in the hole 2, where the blueberry tissue culture seedlings are transplanted directly to the hole 2 for planting, while the moss seedlings are sterilized and transplanted to the hole 2 for planting. A spore transfer solution is provided around the blueberry tissue culture seedlings or moss seedlings.

In another aspect, the application further provides a method for breeding blueberry-specific mycorrhizal fungi, as will be described below.

A bottom of a culture bottle is pre-loaded with perlite to form a perlite layer, where a particle size of the perlite is 0.5-1 mm, and a thickness of the perlite layer is 5-10 mm. After sterilized under high pressure, the culture bottle is added with liquid WPM at pH 5.0 to a depth higher than the thickness of the perlite layer at a distance of about 10 mm.

Under a sterile operating environment, a loose absorbent cotton treated by high-pressure sterilization and having a diameter of 10-15 mm is dug with a hole to plant the seedlings in the middle. Then blueberry tissue culture seedlings or moss seedlings are soaked in a mixture of 300 µg/L naphthylacetic acid and 300 µg/L indolebutyric acid for 1 min and transplanted to the hole for planting, and then the absorbent cotton is compacted. The blueberry tissue culture seedlings are transplanted directly into the hole while the moss seedlings are sterilized according to any general methods for plant tissues and then transplanted to the hole.

The blueberry tissue culture seedlings mulched with the absorbent cotton are transferred to the culture bottle. Around the capillary roots 5-8 drops of the spore transfer solution of mycorrhizas are added at equal intervals. The spore transfer solution should kept in contact with the capillary roots. The spore transfer solution is composed of 95% by weight of an edible vegetable oil (such as soybean oil, rapeseed oil and sesame oil), 3% by weight of Tween 80 and 2% by weight of Tween 20. The spore transfer solution after sterilized is added with spores of the mycorrhizas and mixed uniformly to ensure that there are at least 50 spores in each drop of the spore transfer solution.

The culture bottle is sealed and placed in a radiation greenhouse for 2 weeks. After the mycorrhizal fungi grew with blueberry roots to cover the absorbent cotton, the absorbent cotton is transferred from the culture bottle under sterile conditions and cut into pieces with a particle size of 3-5 mm by a scissor, and then the pieces of absorbent cotton are sealed in a sterile bag. When used as bacterial fertilizer for inoculation in the field, the pieces of the absorbent cotton are buried directly around the blueberry roots, while used for research, one of the pieces of the absorbent cotton is washed with sterile water and filtered with a filter paper to obtain mycorrhizal spores.

After the absorbent cotton is removed, the blueberry seedlings can be recycled and treated according to the above steps until the seedlings are too large to be cultivated.

Although the embodiments of the invention are illustrated and described above, it should be understood that those skilled in the art can make various equivalent changes, modifications, replacements and variants without departing from the spirit of the invention. The scope of the application should be defined by the appended claims.

What is claimed is:

1. A device for breeding blueberry-specific mycorrhizal fungi, comprising: a container;
   wherein a bottom of the container is laid with perlite to form a perlite layer; an absorbent cotton is arranged on the perlite layer; a hole for planting is provided in the absorbent cotton and a blueberry tissue culture seedling or moss seedling is placed in the hole; and a spore transfer solution is provided around the blueberry tissue culture seedling or moss seedling.

2. The device of claim 1, wherein a thickness of the perlite layer is 5-10 mm and the perlite is sterilized under high pressure before use.

3. The device of claim 2, wherein the perlite layer is soaked in a liquid woody plant medium (WPM) at pH 5.0, and the liquid WPM is 10 mm higher than the perlite layer.

4. The device of claim 1, wherein the blueberry tissue culture seedling is transplanted directly to the hole for planting, while the moss seedling is sterilized and then transplanted to the hole for planting.

5. A method for breeding blueberry-specific mycorrhizal fungi, comprising:
   1) pre-loading perlite on a bottom of a culture bottle to form a perlite layer followed by high-pressure sterilization; and pouring a liquid woody plant medium (WPM) at pH 5.0 into the culture bottle to immerse the perlite layer;

2) under a sterile operating environment, digging out a hole for planting in a middle of a loose absorbent cotton treated by high-pressure sterilization; soaking blueberry tissue culture seedling or moss seedling in a mixture of naphthylacetic acid and indolebutyric acid for 1 min and then transplanting the soaked seedling to the hole for planting; and then compacting the absorbent cotton;

3) transferring the blueberry tissue culture seedling mulched with the absorbent cotton to the culture bottle; and dropwise adding 5-8 drops of a spore transfer solution of mycorrhizas at equal intervals around blueberry capillary roots; and 4) sealing and placing the culture bottle in a radiation greenhouse for 2 weeks; after the mycorrhizal fungi grow with blueberry roots to cover the absorbent cotton, transferring the absorbent cotton from the culture bottle under a sterile condition; cutting the absorbent cotton into pieces with a scissor and sealing the pieces in a sterile bag.

6. The method of claim 5, wherein in step (1), a particle size of the perlite is 0.5-1 mm and a thickness of the perlite layer is 5-10 mm.

7. The method of claim 5, wherein in step (2), a concentration of the mixture of naphthylacetic acid and indolebutyric acid is 300 µg/L.

8. The method of claim 5, wherein in step (3), the spore transfer solution is a mixture composed of 95% by weight of an edible vegetable oil, 3% by weight of polysorbate 80 and 2% by weight of polysorbate 20; the spore transfer solution after sterilized is added with spores of the mycorrhizas and mixed uniformly to ensure that there are at least 50 spores in each drop of the spore transfer solution.

9. The method of claim 5, wherein in step (4), when used as a bacterial fertilizer for inoculation in the field, the pieces of the absorbent cotton are buried directly around the blueberry roots; while used for research, one of the pieces of the absorbent cotton is washed with sterile water and filtered with a filter paper to obtain the spores of the mycorrhizal fungi.

\* \* \* \* \*